(12) United States Patent
Norris et al.

(10) Patent No.: US 11,592,458 B2
(45) Date of Patent: Feb. 28, 2023

(54) WIND DIRECTION INDICATOR

(71) Applicant: Cirrus Outdoors, LLC, Conroe, TX (US)

(72) Inventors: Jeffrey Norris, Montgomery, TX (US); James Angelo Angott, Victoria, TX (US)

(73) Assignee: Cirrus Outdoors, LLC, Conroe, TX (US)

( * ) Notice: Subject to any disclaimer, the term of this patent is extended or adjusted under 35 U.S.C. 154(b) by 468 days.

(21) Appl. No.: 16/788,077

(22) Filed: Feb. 11, 2020

(65) Prior Publication Data

US 2020/0278374 A1    Sep. 3, 2020

Related U.S. Application Data

(60) Provisional application No. 62/812,824, filed on Mar. 1, 2019.

(51) Int. Cl.
| | | |
|---|---|---|
| *G01P 13/00* | (2006.01) | |
| *H04N 1/00* | (2006.01) | |
| *C06D 3/00* | (2006.01) | |
| *G01P 13/02* | (2006.01) | |

(52) U.S. Cl.
CPC ............ *G01P 13/0093* (2013.01); *C06D 3/00* (2013.01); *G01P 13/02* (2013.01); *H04N 1/00307* (2013.01)

(58) Field of Classification Search
CPC ....... G01P 13/0093; G01P 13/02; C06D 3/00; H04N 1/00307
See application file for complete search history.

(56) References Cited

U.S. PATENT DOCUMENTS

| | | | |
|---|---|---|---|
| 3,112,645 A | 12/1963 | Glass | |
| 4,423,626 A | 1/1984 | Herschede | |
| 6,421,502 B1* | 7/2002 | Aronie | A63H 33/28 |
| | | | 392/404 |
| 7,158,020 B2* | 1/2007 | Grady, Jr. | G09F 9/33 |
| | | | 116/63 T |
| 7,878,678 B1* | 2/2011 | Stamatatos | B60Q 1/2696 |
| | | | 116/63 P |
| 8,897,628 B2* | 11/2014 | Conley | H05B 1/0244 |
| | | | 392/386 |
| 9,739,796 B2* | 8/2017 | Ferrara, Jr. | F22B 1/28 |
| 9,841,433 B2* | 12/2017 | Norris | A63J 5/025 |
| 9,989,552 B2* | 6/2018 | Ferrara, Jr. | A01M 31/00 |
| 10,114,036 B2* | 10/2018 | Ferrara, Jr. | G01P 13/0093 |

(Continued)

OTHER PUBLICATIONS

Pea Soup Ltd.—The Smoke Machine Specialists, "Battery Powered Smoke Machines", Jul. 6, 2014 (snap shot of Jul. 6, 2014 found on Wayback Machine web.archive.org, Retrieved from https://smokemachines.net/buy-tiny-foggers.shtml) (Year: 2014).*

*Primary Examiner* — Nimeshkumar D Patel
*Assistant Examiner* — Tania Courson
(74) *Attorney, Agent, or Firm* — Tumey L.L.P.

(57) ABSTRACT

A wind direction indicator includes a smoke generator, a housing, an electrical power source, an air pump and a switch all arranged such that the indicator may be actuated by a user using a single hand. The smoke generator may be a cartomizer as an example. The indicator may include a rechargeable battery, a power outlet circuit and a SD card reader and transmitter for transmitting data from the SD card to a cellphone via a wireless connection such as Wi-Fi or bluetooth.

8 Claims, 2 Drawing Sheets

(56) References Cited

U.S. PATENT DOCUMENTS

| | | | |
|---|---|---|---|
| 10,267,821 B2* | 4/2019 | Norris | A63J 5/025 |
| 10,598,685 B2* | 3/2020 | Ferrara, Jr. | A01M 31/00 |
| 10,638,768 B2* | 5/2020 | Flood | A23B 4/052 |
| 10,697,993 B2* | 6/2020 | Norris | A63J 5/025 |
| 2006/0042373 A1* | 3/2006 | Kirollos | C06D 3/00 |
| | | | 73/170.04 |
| 2009/0277973 A1* | 11/2009 | Kennon | A01M 29/12 |
| | | | 239/569 |
| 2018/0206478 A1* | 7/2018 | Wynalda, Jr. | A01M 1/2072 |
| 2018/0275109 A1* | 9/2018 | Akar | G01N 27/49 |
| 2019/0064200 A1* | 2/2019 | Ferrara, Jr. | G01P 13/02 |
| 2019/0110464 A1* | 4/2019 | Wynalda, Jr. | A01M 1/2077 |

* cited by examiner

WIND DIRECTION INDICATOR

CROSS-REFERENCE TO RELATED APPLICATIONS

This application claims priority to provisional application Ser. No. 62/812,824 filed Mar. 1, 2019, the entire contents of which is hereby incorporated herein by reference thereto.

BACKGROUND OF THE INVENTION

Field of the Invention

This invention is directed to a portable, hand held device for generating smoke which will serve to indicate the wind direction in an outdoor location.

Background of the Invention

While hunting it is extremely important to position oneself downwind of the game being hunted. This is because the game normally has a highly acute sense of smell and would therefore detect the presence of a human should the human be in a position upwind of the game. Various attempts to provide an indication of the wind direction have not been fully successful. For example, U.S. Pat. No. 4,423,626 discloses a squeeze bottle containing a powder for generating a cloud of powder. The problem with this design is that it is very difficult to control the proper cloud dispersion for properly checking wind direction. Also, the movement required to shake the container to dispense the talc powder can spook game. The talc powder being a solid, also does not carry well. For example, in the mountains where you have thermal updrafts and downdrafts, the talcum powder being a solid will fall, whereas smoke will rise and fall with the drafts. U.S. Pat. No. 3,112,645 discloses a smoke generator that is attached to a rifle. This is difficult to manipulate in the field since the cap must be screwed and unscrewed each time it is desired to generate smoke. Also, it lacks a positive air flow generator so that the production of smoke and its release to the atmosphere is not positively assisted.

Consequently, there is a need for a reliable and easy to manipulate smoke generator for use in hunting and other activities.

BRIEF SUMMARY OF SOME OF THE PREFERRED EMBODIMENTS

These and other needs in the art are addressed in one embodiment by a smoke generator that includes a cartomizer for example positioned within a hand held housing. A finger actuated air pump is positioned on an outside surface of the housing as is a finger actuated switch. A battery is positioned within the housing to provide electrical power for a heating element within the cartomizer.

The components are arranged such that the user can operate the device with one hand. A thumb of the user's hand can depress the switch to provide power for heating a smoke producing liquid within the cartomizer.

At the same time the user can actuate an air pump with a trigger finger to provide a positive flow of air to the cartomizer. The air flow forces the smoke to the ambient through an outlet.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 2:
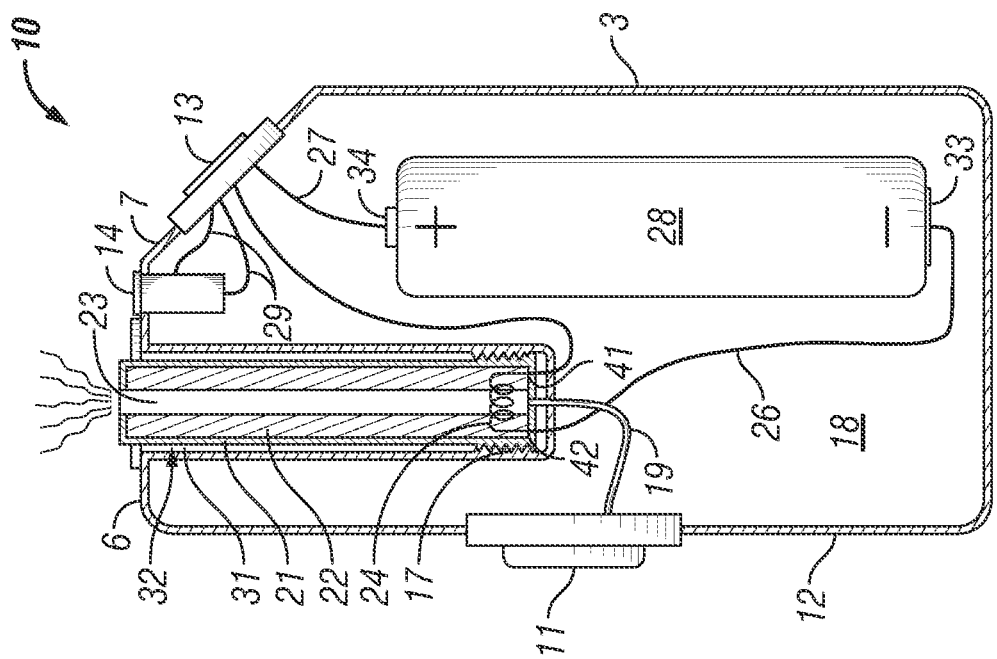
FIG. 2 is an interior view of the housing of the embodiment shown in FIG. 1.
Figure 1:
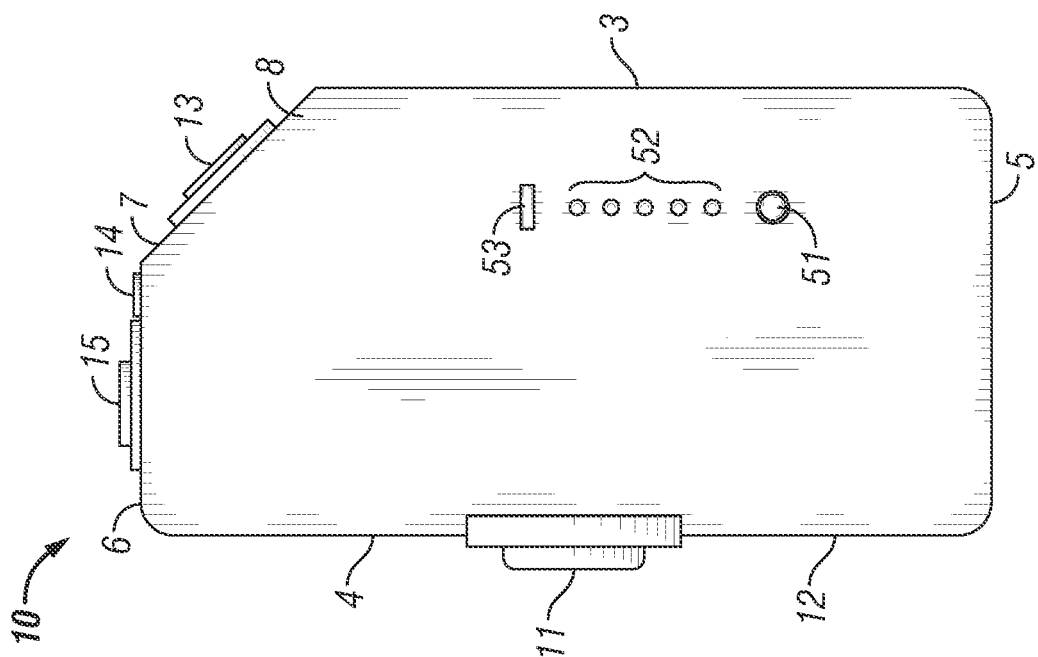
FIG. 1 is a front view of an embodiment of the invention

As shown in FIGS. 1 and 2, an embodiment of the invention 10 includes a generally rectangular housing having a top 6, a bottom 5, sides 3, 4 and an inclined portion 7 of the housing.

An air pump 11 similar to a priming pump for small engines is secured to side 4. A cutout or window section (not shown) is provided on a front panel 8 of the housing and a compass (not shown) may be secured to the front panel. Additionally, one or more LED lights 14 in a circular array around generator 32 may be mounted on inclined portion 7 of the housing and connected to switch 13.

FIG. 2 illustrates the interior arrangement of the smoke direction indicator. A battery 28 is suitably mounted within the housing in a known matter and includes positive and negative terminals 33 and 34 respectively which are connected to a heating element 24 via switch 13 and wires 26, 27.

A pocket 31 is positioned within and fixed to housing 12 for supporting a smoke generator 32 which may take the form of a cartomizer such as those used in electronic cigarettes, for example. Any well-known smoke generator may be used. The housing includes a rear wall 18.

An embodiment of the smoke generator includes a housing 21 having a central air passageway 23 and a fibrous mass 22 which is impregnated with a smoke generating liquid, for example a mixture of water and a glycol compound. A masking material may also be added to the mixture for masking human scent and may include natural odors such as pine or cedar.

Housing 21 may be threaded such as at 17 for retention within pocket 42 which would have complementary threads at its bottom. Smoke generator also includes a heating element 24 positioned within the fibrous mass 22. Heating coil 24 includes positive and negative terminals 41, 42 which are connected to battery 28 via a known battery connector as is known in the art.

Air passageway 23 extends through housing 21 at its lower end and is connected to a conduit 19 which is connected to air pump 11. A hunter may operate pump 11 with a trigger finger to cause air flow through passageway 23 which will contain smoke being generated by smoke generator 32.

In use, a hunter may hold the housing 12 in one hand such that the thumb of the user may be used to close switch 13 while at the same time the hunter can operate air pump 11 with a trigger finger. Thus, as smoke is generated within the smoke generator by heating the liquid impregnating fibrous mass 22, air will be forced through passageway 23 by pump 11 and will entrain the smoke formed within the smoke generator.

It should be noted that while the above description of the invention is in terms of a wind direction indicator for hunters, the device could be used to detect leaks in fluid pressure systems such as air conditioning systems, or for aiding golfers in determining the wind direction prior to striking the golf ball.

Figure 3:
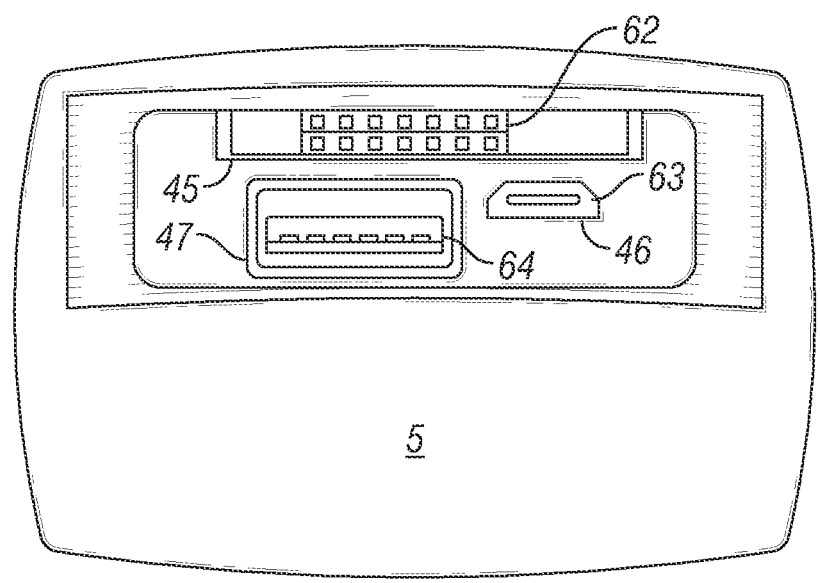
FIG. 3 is a bottom view of a second embodiment of the invention.

The wind direction indicator embodiment shown in FIG. 3 is a multiple function device in addition to indicating wind and thermals direction. It has multiple lights surrounding the vapor generator for viewing the vapor at night and for use as a flashlight.

The battery of the device can be used as a power source for charging or powering other devices such as cellphones and cameras. The wind direction indicator has a SD card reader and transmitter that can read images from game cameras, for example, and transmit them to a cellphone utilizing a Bluetooth or Wi-Fi connection transmitted to an app downloaded into the phone via an internet connection.

As shown in FIG. 3, this embodiment of the invention includes the features of the embodiment of FIGS. 1 and 2 with additional features. The bottom portion 5 of the housing is provided with a first cutout 45 which allows for a SD card to be inserted into an SD card reader 62 located within the housing.

A second cutout 46 allows for a charging cable to be inserted into a charging connector 63 positioned within the housing to allow for charging of battery 28. A third cutout 47 in the bottom portion 5 of the housing allows for a power cable to be connected to a power outlet 64 located within the housing for charging of external devices from battery 28. Elements 62, 63, and 64 are well known in the art and may be positioned on a mother board, not shown, positioned within the housing. Appropriate circuitry for supporting elements 62, 63, and 64 is also provided on the mother board.

Figure 4:
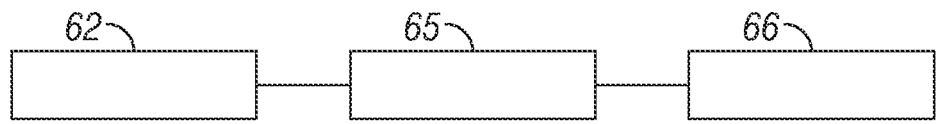
FIG. 4 is a schematic view of internal components of the device.

As shown in FIG. 4 SD card reader 62 is connected to a microprocessor 65 which is connected to a transmitter 66 located within the housing. Transmitter 66 supports all standards and wireless protocols including Wi-Fi and Bluetooth. Apps downloaded on a cellphone will permit images stored in the SD card that are transmitted to the phone via the wireless network to be displayed on the cellphone. Furthermore, the app may include additional functionality such as a compass.

As shown in FIG. 1, face 8 of the housing may include button switch 51, power level LED's 52 and wireless network connection indicator 53. When button switch 51 is depressed fee charging level of the battery will be displayed and connection to a wireless network will be confirmed by indicator 53 which may be for example a LED.

Appropriate connections from the charger, the SD transmitter and power output device to the battery are provided.

Furthermore, although the smoke generator has been illustrated in the drawings as being positioned within the housing, in an attentive embodiment fee smoke generator 32 may be threaded in a connector located in the top portion 6 of the housing.

What is claimed is:

1. A wind direction indicator for indicating a direction of wind in ambient surroundings, comprising;
   a) a first housing including a top, a bottom, a first side portion, a second side portion, a front portion, and a rear portion;
   b) a smoke generator, the smoke generator including a second housing disposed in the first housing, a heating element, a fibrous mass impregnated with a smoke generating liquid, and an internal air passageway extending through the fibrous mass and having an inlet and an outlet;
   c) a switch connected to the heating element for energizing the heating element from a power source whereby smoke is discharged from the smoke generator into the ambient surroundings;
   d) an air pump for introducing air into the inlet of the air passageway, which is connected thereto by a conduit; and
   e) a SD card reader located within the bottom of the first housing, the SD card reader in communication with a transmitter located within the first housing thereby allowing images stored on a SD card inserted into the SD card reader to be available for transmission over wireless protocols.

2. The wind direction indicator of claim 1 wherein the first housing includes an inclined portion between the top and the first side portion, the switch being mounted on the inclined portion, and the air pump being mounted on the second side portion, whereby the wind direction indicator may be actuated by a user's thumb and trigger finger.

3. The wind direction indicator of claim 1 further including a pocket positioned within the first housing, the smoke generator being removably secured in the pocket.

4. The wind direction indicator of claim 1 further including one or more lights mounted on the top of the first housing for illuminating the smoke as it is generated.

5. The wind direction indicator of claim 1 wherein the power source comprises a battery.

6. The wind direction indicator of claim 1 further including a charging cutout in the bottom of the first housing for permitting a charging cable to be connected to a charging connector located within the first housing.

7. The wind direction indicator of claim 6 further including a power outlet cutout in the bottom of the first housing for allowing a power outlet cable to be connected to a power outlet connector located within the first housing.

8. The wind direction indicator of claim 7 further including a microprocessor located within the first housing and in communication with the SD card reader and the transmitter.

* * * * *